(12) United States Patent  (10) Patent No.: US 7,870,741 B2
Corsmeier et al.  (45) Date of Patent: Jan. 18, 2011

(54) TURBINE ENGINE VALVE ASSEMBLY AND METHOD OF ASSEMBLING THE SAME

(75) Inventors: Donald Michael Corsmeier, West Chester, OH (US); David Lynn Dawson, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 1150 days.

(21) Appl. No.: 11/753,907

(22) Filed: May 25, 2007

(65) Prior Publication Data

US 2009/0211090 A1  Aug. 27, 2009

(51) Int. Cl.
*F02K 1/00* (2006.01)

(52) U.S. Cl. ........................ 60/770; 60/226.1

(58) Field of Classification Search .............. 60/770, 60/226.1, 262, 231, 782, 785, 39.23; 239/265.17
See application file for complete search history.

(56) References Cited

U.S. PATENT DOCUMENTS

| | | | |
|---|---|---|---|
| 3,964,257 A * | 6/1976 | Lardellier | 60/226.1 |
| 4,217,755 A | 8/1980 | Williams | |
| 4,285,194 A | 8/1981 | Nash | |
| 4,409,788 A | 10/1983 | Nash et al. | |
| 4,416,111 A | 11/1983 | Lenahan et al. | |
| 4,442,672 A | 4/1984 | Fischer | |
| 5,048,286 A | 9/1991 | Stransky et al. | |
| 5,054,286 A | 10/1991 | Stransky et al. | |
| 5,113,649 A | 5/1992 | Siedlecki, Jr. | |
| 5,136,840 A * | 8/1992 | Nash | 60/226.3 |
| 5,182,905 A | 2/1993 | Stransky et al. | |
| 5,184,461 A | 2/1993 | Stransky et al. | |
| 5,211,007 A | 5/1993 | Marvin | |
| 5,287,697 A | 2/1994 | Johnson et al. | |
| 5,305,599 A | 4/1994 | Marvin | |
| 5,307,624 A | 5/1994 | Even-Nur et al. | |
| 5,343,697 A | 9/1994 | Johnson et al. | |
| 5,417,056 A | 5/1995 | Johnson et al. | |
| 5,688,296 A | 11/1997 | Andrus, Jr. et al. | |
| 5,694,768 A | 12/1997 | Johnson et al. | |
| 5,771,868 A | 6/1998 | Khair | |
| 5,924,276 A | 7/1999 | Mowill | |
| 6,145,318 A | 11/2000 | Kaplan et al. | |
| 6,477,829 B1 | 11/2002 | Hunter et al. | |
| 6,694,723 B2 | 2/2004 | Ward | |
| 6,775,990 B2 | 8/2004 | Swinford | |
| 7,007,476 B2 | 3/2006 | Mains et al. | |
| 7,140,174 B2 | 11/2006 | Johnson | |

* cited by examiner

*Primary Examiner*—Michael Cuff
*Assistant Examiner*—Andrew Nguyen
(74) *Attorney, Agent, or Firm*—William Scott Andes, Esq.; Armstrong Teasdale LLP

(57) ABSTRACT

A method of assembling a crank assembly for a turbine engine. The turbine engine includes a valve assembly including an outer fairing and an inner fairing coupled to the outer fairing with a strut. The valve assembly further includes an annular slide valve coupled between the inner and outer fairings. The valve assembly is positioned within a duct having a radially outer duct wall and a radially inner duct wall. The method includes coupling a first arm of a crank assembly to the annular slide valve, and coupling a second arm of the crank assembly to the outer fairing such that the crank assembly controls movement of the annular slide valve and for moving the outer and inner fairings between a first operational position and a second operational position to facilitate regulating an amount of airflow channeled through the turbine engine.

20 Claims, 4 Drawing Sheets

US 7,870,741 B2

TURBINE ENGINE VALVE ASSEMBLY AND METHOD OF ASSEMBLING THE SAME

STATEMENT REGARDING FEDERALLY SPONSORED RESEARCH & DEVELOPMENT

The U.S. Government has certain rights in this invention as provided for by the terms of Contract No. N00019-04-C-0093. The Government may have certain rights in this invention.

BACKGROUND OF THE INVENTION

This invention relates generally to turbine engines and, more particularly, to a valve assembly for turbine engines.

At least some known aircraft turbine engines include a fan, a compressor, a combustor, a high pressure turbine, a low pressure turbine, and an augmentor or "afterburner". Airflow entering the fan is compressed. Airflow exiting the fan is split such that a portion is directed into the compressor and the remaining portion, referred to as fan bypass flow, is directed into a bypass passage where it bypasses the compressor, the combustor, the high pressure turbine, and the low pressure turbine. Airflow entering the compressor is compressed and is discharged towards the combustor wherein it is mixed with fuel and ignited, producing hot combustion gases used to drive both the high pressure and the low pressure turbines. Moreover, at least some known turbine engines combine a portion of the fan bypass flow with the airflow exiting the low pressure turbine.

To regulate the amount of bypass air entering the augmentor, at least some turbine engines include a valve assembly. More specifically, in some known turbine engines, the flow of the fan bypass air is regulated based on specific exhaust liner pressure ratio requirements demanded for the type of flight mode of the aircraft. At least some known valve assemblies include a plurality of blocker doors that are independently adjusted to maintain exhaust liner pressure ratio requirements. As such, each blocker door includes a separate kinematic system, which may each include, for example, a plurality of crank-arm shafts and actuators. Accordingly, such valve assemblies are generally complex designs which add additional cost and weight to the aircraft.

BRIEF DESCRIPTION OF THE INVENTION

In one aspect, a method of assembling a crank assembly for a turbine engine. The turbine engine includes a valve assembly including an outer fairing and an inner fairing coupled to the outer fairing with a strut. The valve assembly further includes an annular slide valve coupled between the inner and outer fairings. The valve assembly is positioned within a duct having a radially outer duct wall and a radially inner duct wall. The method includes coupling a first arm of a crank assembly to the annular slide valve, and coupling a second arm of the crank assembly to the outer fairing such that the crank assembly controls movement of the annular slide valve and for moving the outer and inner fairings between a first operational position and a second operational position to facilitate regulating an amount of airflow channeled through the turbine engine.

In a further aspect, a crank assembly for a turbine engine is provided. The engine includes a valve assembly including a radially outer fairing configured to translate along a radially outer duct wall of the turbine engine, a radially inner fairing configured to couple to the outer fairing such that the inner fairing is configured to translate along a radially inner duct wall of the turbine engine, and an annular slide valve coupled between the radially outer and the radially inner duct walls. The crank assembly includes a first arm, and a second arm. The first arm is coupled to the annular slide valve. The second arm is coupled to the outer fairing. The crank assembly controls movement of the annular slide valve and movement of the outer and inner fairings between a first operational position and a second operational position to facilitate regulating an amount of airflow channeled through the turbine engine.

In another aspect, a turbine engine includes a fan assembly, a fan bypass duct coupled to the fan assembly, and a valve assembly coupled downstream from the fan assembly within the fan bypass duct. The valve assembly includes a radially outer fairing configured to translate along a radially outer duct wall of the turbine engine, a radially inner fairing configured to couple to the outer fairing such that the inner fairing is configured to translate along a radially inner duct wall of the turbine engine, and an annular slide valve coupled between the radially outer and the radially inner duct walls. The engine further includes a crank assembly including a first arm and a second arm. The first arm is coupled to the annular slide valve, and the second arm is coupled to the outer fairing. The crank assembly controls movement of the annular slide valve and of moving the outer and inner fairings between a first operational position and a second operational position to facilitate regulating an amount of airflow channeled through the turbine engine.

DETAILED DESCRIPTION OF THE INVENTION

Figure 1:
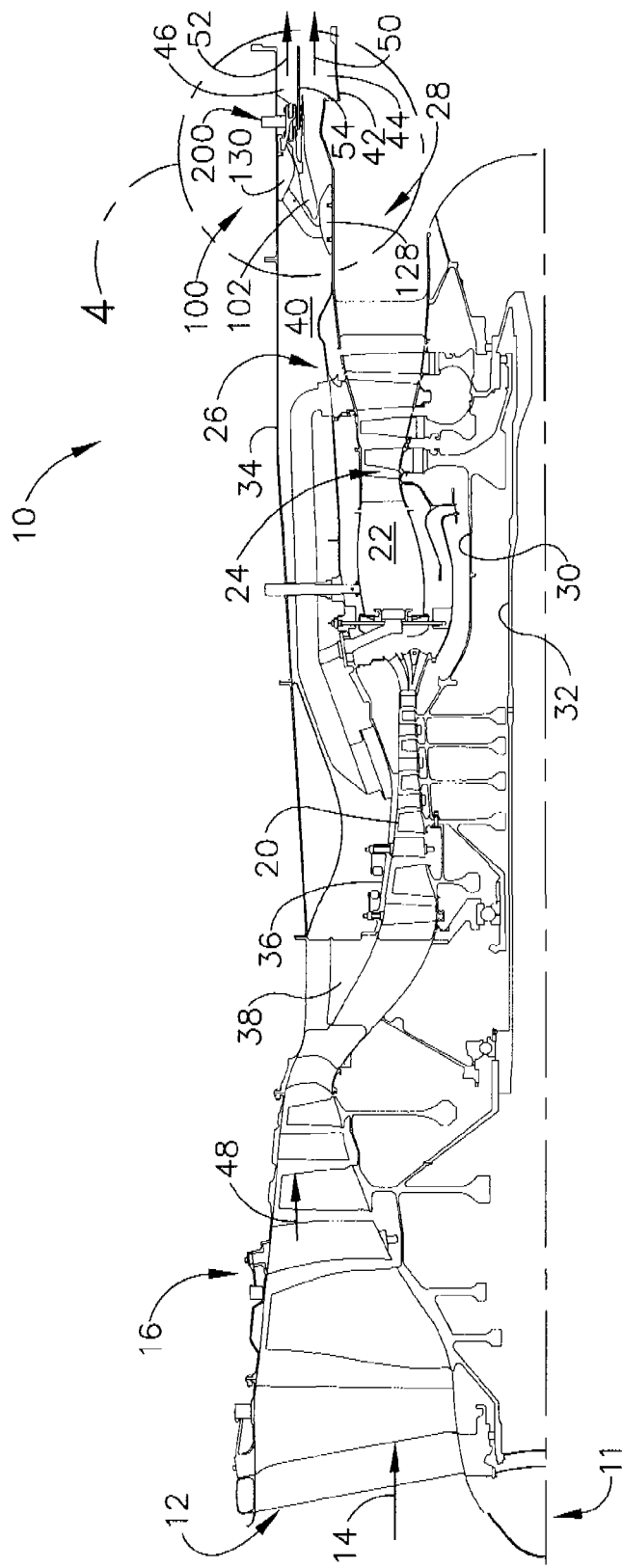
FIG. 1 is a schematic illustration of an exemplary turbine engine.

FIG. 1 is a schematic illustration of an exemplary variable cycle turbine engine 10 having a longitudinal centerline 11. Turbine engine 10 includes an annular inlet 12 for receiving ambient air 14 followed in axial flow relationship by a fan assembly 16, a high pressure compressor (HPC) 20, a combustor 22, a high pressure turbine (HPT) 24, a low pressure turbine (LPT) 26 and an augmentor 28. The HPT 24 powers the HPC 20 through a first shaft 30. LPT 26 powers the fan assembly 16 by a second shaft 32. Engine 10 further includes an outer casing 34 which is spaced from an inner casing 36 including a forward section 38 of inner casing 36 defining a bypass duct 40. In the exemplary embodiment, augmentor 28 includes a diffuser liner 42.

In the exemplary embodiment, turbine engine 10 also includes at least one slide valve assembly 100 coupled within bypass duct 40. Specifically, engine 10 includes a plurality of valve assemblies positioned circumferentially within duct 40. More specifically, valve assembly 100 is positioned to facilitate separating bypass duct 40 into a radially inner bypass duct 44 and a radially outer bypass duct 46. Moreover, in the exemplary embodiment, fan bypass air 48 entering bypass duct 40 is divided into an inner air flow 50 and an outer air flow 52. In the exemplary embodiment, valve assembly 100 facilitates regulating the amount of inner air flow 50 that is channeled through inner bypass duct 44 and the amount of outer air flow 52 that is channeled through outer bypass duct 46. In the exemplary embodiment, a separation liner 54 contacts a tail portion of valve assembly 100 and extends to diffuser liner 42 to facilitate channeling inner air flow 50 through inner bypass duct 44. Moreover, liner 42 also facilitates channeling outer air flow 52 through outer bypass duct 46. A seal 56 extends between valve tail 101 and separation liner 54 to facilitate reducing leakage of outer air flow 52 into inner bypass duct 44. More specifically, in the exemplary embodiment, seal 56 is, for example, but is not limited to being, a thin sheet metal or "turkey feather" type seal. In an alternative embodiment, seal 56 is any seal that enables turbine engine 10 to function as described herein.

Figure 2:
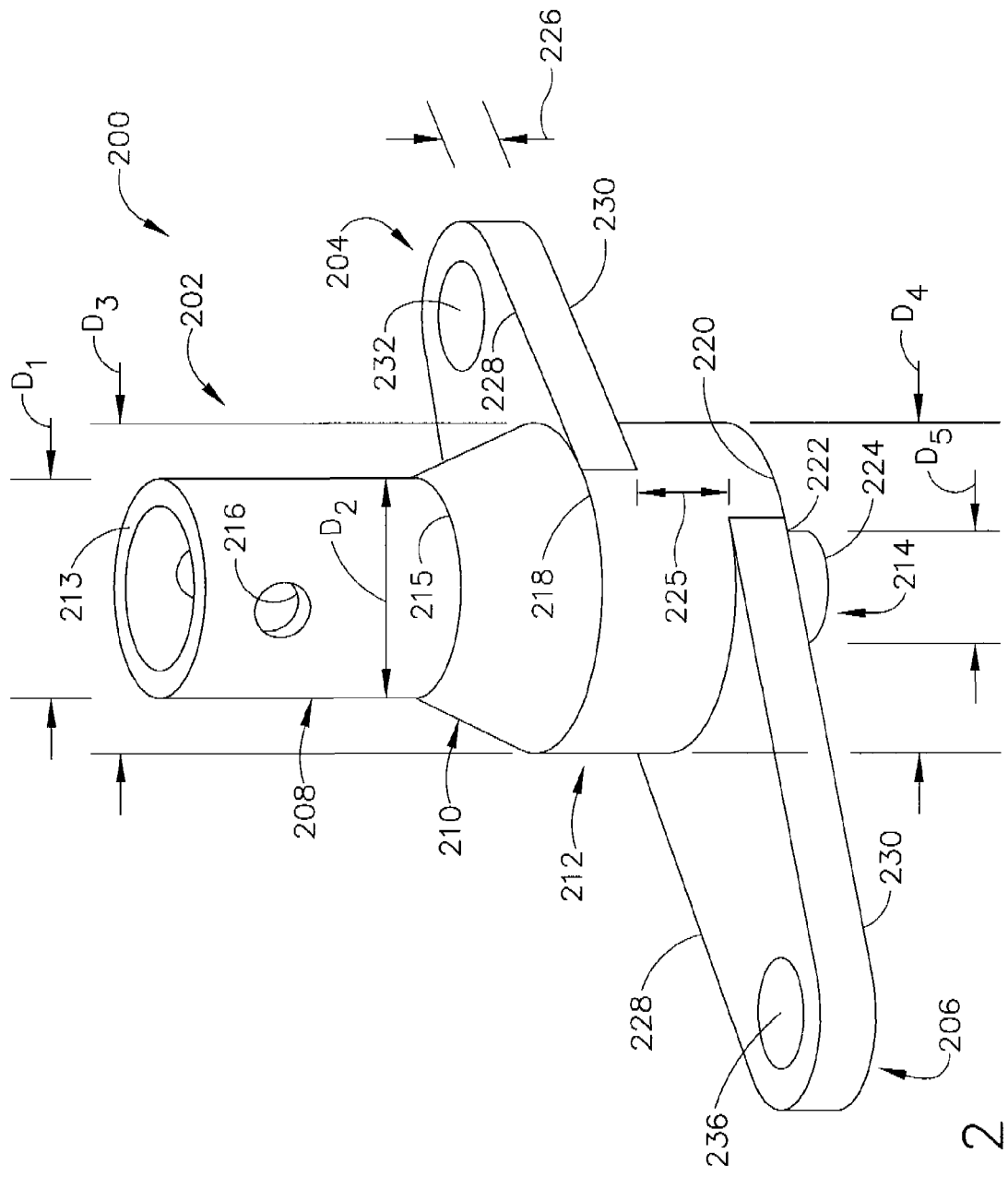
FIG. 2 is an enlarged view of a portion of an exemplary crank arm assembly used with turbine engine shown in FIG. 1.
Figure 3:
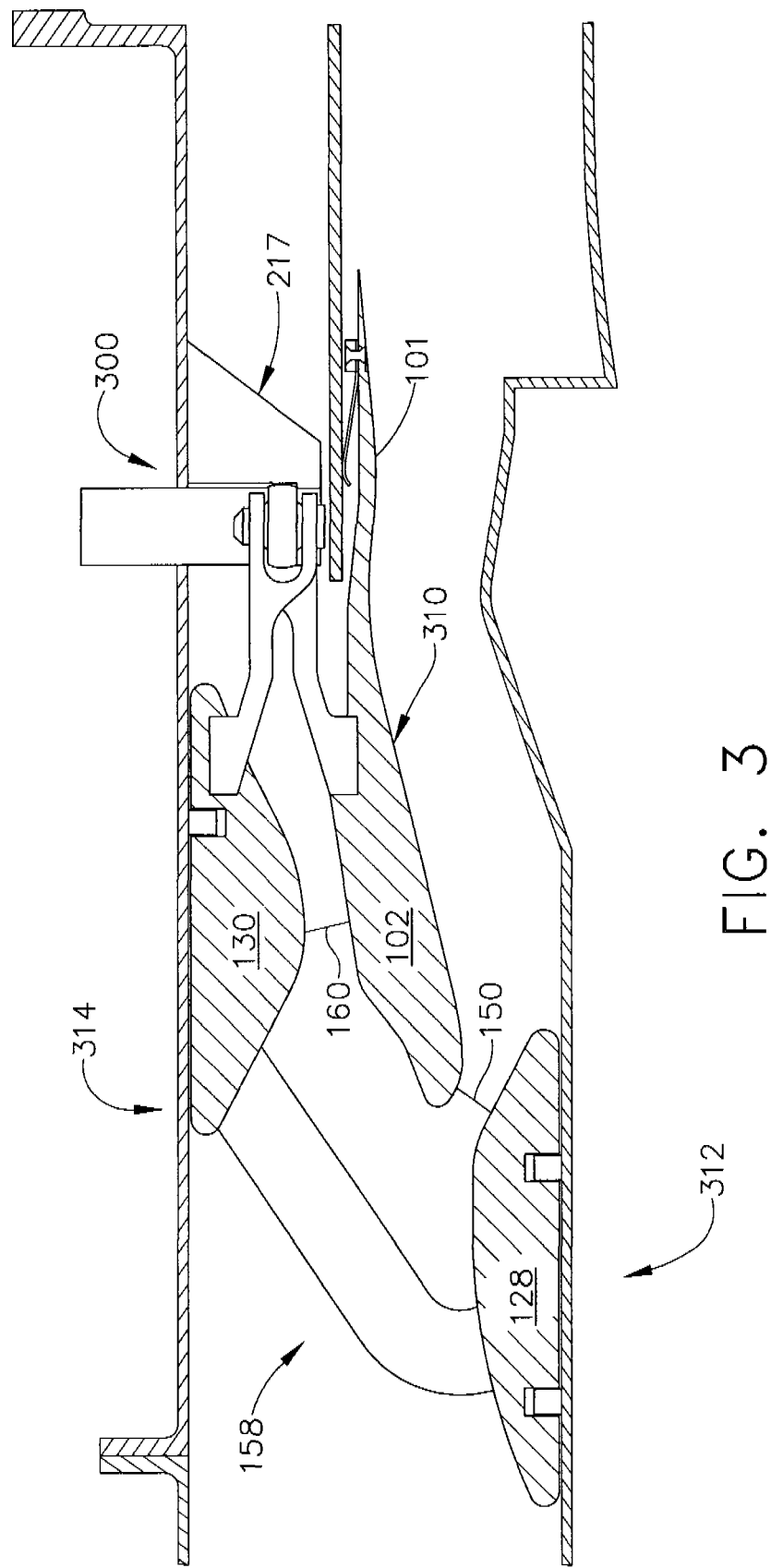
FIG. 3 is an enlarged schematic view of an exemplary valve assembly used with the turbine engine shown in FIG. 1 and in a first operational position.
Figure 4:
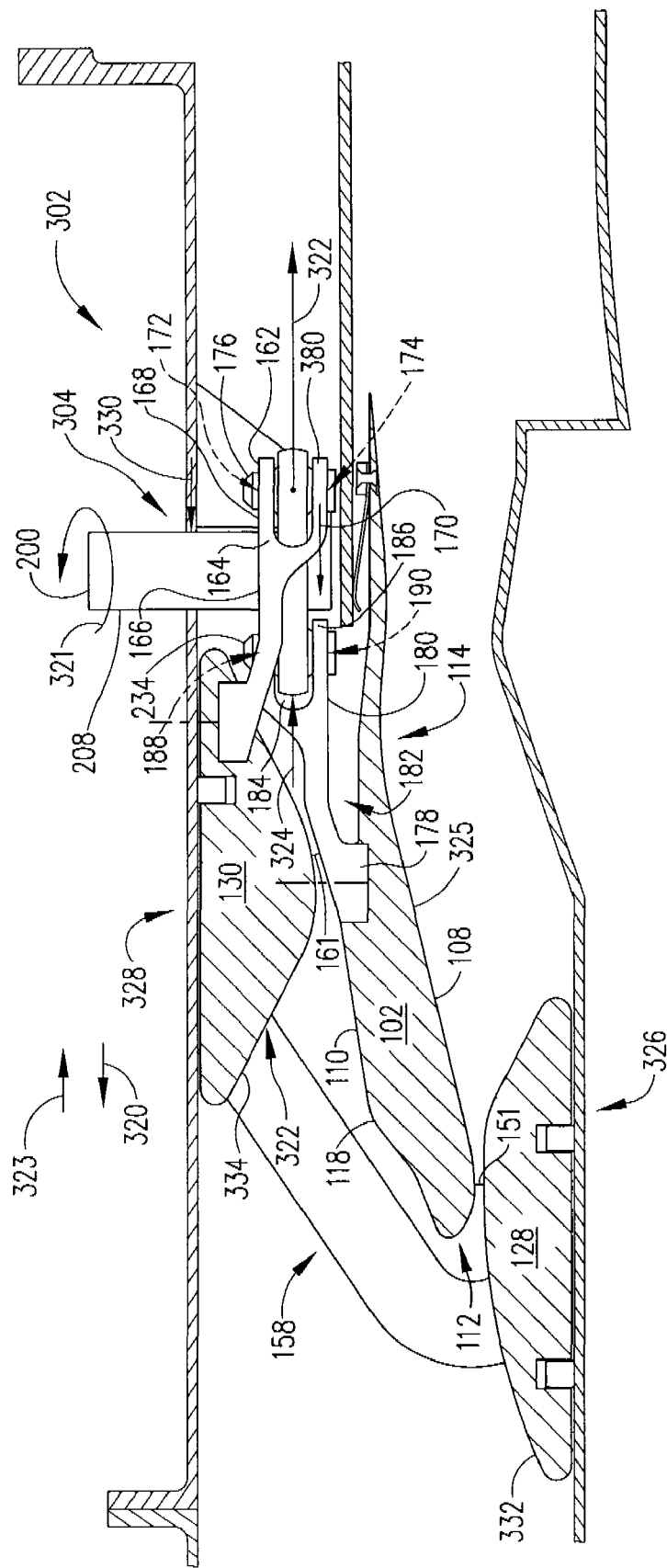
FIG. 4 is a schematic view of the valve assembly shown in FIG. 3 and in a second operational position.

FIG. 2 is an enlarged view of a portion of an exemplary crank assembly 200 used with turbine engine 10 (shown in FIG. 1). FIG. 3 is an enlarged schematic illustration of valve assembly 100 and crank assembly 200 in a first operational position 300. FIG. 4 is an enlarged schematic view of valve assembly 100 and crank assembly 200 in a second operational position 302. Although valve assembly 100 is shown coupled to exemplary engine 10, it should be realized that valve assembly 100 may also be used with a wide variety of turbine engines without limiting the scope of the invention described herein.

In the exemplary embodiment, valve assembly 100 includes an annular slide valve 102 that is slidably coupled within bypass duct 40 via an exemplary crank assembly 200. Slide valve 102 includes a radially inner surface 108 and a radially outer surface 110. In the exemplary embodiment, radially inner surface 108 converges gradually from a valve end or nose 112 to an apex 114, and diverges gradually from apex 114 to seal 56. Further, in the exemplary embodiment, radially outer surface 110 converges gradually from valve end 112 to a first outer apex 118. In the exemplary embodiment, valve end 112 is shaped to facilitate splitting fan bypass flow 48 while reducing separation of flow 48.

Valve assembly 100 includes an inner fairing 128 and an outer fairing 130 that is coupled downstream from inner fairing 128. More specifically, in the exemplary embodiment, outer fairing 130 is positioned proximate radially outer casing 34 and inner fairing 128 is positioned proximate radially inner casing 36. A plurality of seals are coupled between fairing 130 and casing 34, and a plurality of seals are coupled between fairing 128 and casing 36. In the exemplary embodiment, the plurality of seals are at least one of, but not limited to, turkey feather seals, prism seals, and/or any suitable seals that enable assembly 100 to function as described herein. In the exemplary embodiment, outer fairing 130 and inner fairing 128 are coupled together via a strut 158 and translate axially together between outer casing 34 and inner casing 36. Outer fairing 130, inner fairing 128, and strut 158 are coupled together using any other coupling means that enables valve assembly 100 to function as described herein, such as, but not limited to, a brazing procedure, a welding procedure, a riveting procedure, and/or any combination thereof. Annular slide valve 102 is extends between inner fairing 128 and outer fairing 130. Moreover, in the exemplary embodiment, inner fairing 128 and outer fairing 130 are each contoured such that inner bypass duct 44 and outer bypass duct 46 each have variable cross-sectional areas.

In the exemplary embodiment, strut 158 enables inner and outer fairings 128 and 130 to slide substantially simultaneously within duct 40. In the exemplary embodiment, strut 158 is any suitable mechanism that enables engine 10 to function as described herein. Moreover, engine slide valve assembly 100 is coupled to at least one crank assembly 200. Crank assembly 200 controls the moment; i.e. axial translation of valve 102, outer fairing 130, inner fairing 128, and strut 158. Specifically, crank assembly 200 enables slide valve 102, and inner and outer fairings 128 and 130 to move between first and second operational positions 300 and 302, respectively.

In the exemplary embodiment, a sync ring (not shown) is coupled radially outward of a portion of outer casing 34. The sync ring is coupled to at least one crank assembly 200 via a mechanism (not shown). In an alternative embodiment, the mechanism may be actuated without the sync ring.

Engine 10 includes a plurality of crank assemblies spaced circumferentially within outer casing 34. In the exemplary embodiment, eight crank assemblies 100 are spaced circumferentially within outer casing 34. The eight crank assemblies 100 are configured to help maintain assemblies 100 and 200 in plane when loaded by forces. In the exemplary embodiment, a portion of crank assembly 200 extends through outer casing 34 such that four of the eight crank assemblies are coupled to the sync ring. Furthermore, at least one actuation assembly (not shown) is coupled to the sync ring to hydraulically operate crank assembly 200. In the exemplary embodiment, engine 10 includes at least two actuation assemblies. In an alternative embodiment, engine 10 includes any number of crank assemblies 200 and/or any number of actuation assemblies that enable engine 10 to function as described herein.

Crank assembly 200 includes a tubular body portion 202, and a first and second crank arm 204 and 206 that each extend outward from tubular body portion 202. Crank assembly 200 is coupled within duct 40 such that tubular body portion 202 is coupled to outer casing 34, arm 204 is coupled to outer fairing 130, and arm 206 is coupled to annular slide valve 102, as described in more detail below.

In the exemplary embodiment, body portion 202, arm 204, and arm 206 are formed integrally together. In an alternative embodiment, body portion 202 and arms 204 and 206 are formed separately and are coupled together using any suitable coupling mechanism. In the exemplary embodiment, body portion 202 and arms 204 and 206 are each fabricated from metallic materials. In an alternative embodiment, body portion 202 and arms 204 and 206 are fabricated from any material that enables assembly 200 to function as described herein.

Tubular body portion 202 includes a first portion 208, a second portion 210 that extends from first portion 208, a third portion 212 that extends from second portion 210, and a fourth portion 214 that extends from third portion 212. In the exemplary embodiment, body portions 208, 210, 212, and 214 are formed integrally together. In an alternative embodiment, body portions 208, 210, 212, and 214 are formed separately and coupled together using any suitable coupling mechanism. First portion 208 is tubular and includes a first end 213 and an opposing second end 215. More specifically, in the exemplary embodiment, first portion 208 has a substantially constant diameter $D_1$ extending between ends 213 and 215. Moreover, in the exemplary embodiment, first portion 208 includes at least one opening 216 formed within the tubular sidewall defining first portion 208. Opening 216 is sized and oriented to receive at least one mechanism (not shown) therethrough. In the exemplary embodiment, fourth portion 214 is coupled to a strut 217 to retain and support crank assembly 200 with a joint (not shown). In the exemplary embodiment, fourth portion 214 is coupled to strut 217 with a pin-in-hole arrangement (not shown). Alternatively, any joint and/or arrangement including, but not limited to including, pins, sliding pins, spherical ball joints that slide on pins, spherical ball joints that require deflection of arms 204 and/or 206, and/or any combination thereof may be used to couple fourth portion 214 to strut 217. In an alternative embodiment, fourth portion 214 may be coupled to liner 54.

Second portion 210 extends from first portion 208 and has a frusto-conical shape that is defined by a first diameter $D_2$ and a second diameter $D_3$ that is larger than first diameter $D_2$. In the exemplary embodiment, diameters $D_1$ and $D_2$ are substantially equal. Third portion 212 extends from second portion 210 and is substantially cylindrical. Moreover, in the exemplary embodiment, third portion 212 includes a first end 218, and an opposite second end 220, and has a substantially constant diameter $D_4$. In the exemplary embodiment, diameters $D_3$ and $D_4$ are substantially equal. Additionally, fourth portion 214 extends from third portion 212 and is substantially cylindrical. Fourth portion includes a first end 222, an opposite second end 224, and has a substantially constant diameter $D_5$. In the exemplary embodiment, diameter $D_4$ is larger than diameter $D_5$. In an alternative embodiment, each portion 208, 210, 212, and 214 may be defined by any diameter or shape that enables crank assembly 200 to function as described herein.

In the exemplary embodiment, first and second crank arms 204 and 206 are coupled to, and extend outward from, third portion 212. In the exemplary embodiment, each arm 204 and 206 has a thickness 226 measured between a first surface 228 and an opposite second surface 230. Moreover, in the exemplary embodiment, each arm 204 and 206 is formed with a parabolic shape that includes an opening 232 and 236, respectively, that extends therethrough. Arms 204 and 206 are oriented approximately diametrically opposite to each other, and are each substantially perpendicular to third portion 212. More specifically, first crank arm 204 is positioned near first end 218, and second crank arm 206 is positioned near second end 220, such that the arms 204 and 206 are separated by a distance 225. In an alternative embodiment, arms 204 and 206 are not separated by distance 225; rather, arms 204 and 206 are co-planar.

In the exemplary embodiment, crank assembly 200 also includes a pair of yokes 162 and 178. At least one of valve 102, outer fairing 130, and/or inner fairing 128 include yokes 162 and 178. In the exemplary embodiment, yokes 162 and 178 are formed separately and coupled to a portion of crank assembly 200. In an alternative embodiment, yokes 162 and 178 are integrally formed with a portion of crank assembly 200. For example, yokes 162 and 178 may be integrally formed with outer fairing 130 and/or slide valve 102. Arm 204 is pivotally coupled to outer fairing 130 via yoke 162. Specifically, yoke 162 includes a U-shaped portion 164 and an extension portion 166 that extends from portion 164. In the exemplary embodiment, portion 166 is coupled to outer fairing 130, and U-shaped portion 164 is formed with a first portion 168 and a second portion 170. Each yoke portion 168 and 170 includes an opening 172 and 174, respectively. First portion 168 is positioned substantially flush against arm surface 228, and second portion 170 is positioned substantially flush against arm surface 230. Moreover, openings 172 and 174 are substantially concentrically aligned with opening 232 such that each opening 172, 174, and 232 sized and oriented to receive a fastening mechanism 176 therethrough. Fastening mechanism 176 rotatably couples yoke 162 and arm 204 together.

Similarly, arm 206 is pivotally coupled to valve 102 via yoke 178. Yoke 178 includes a U-shaped portion 180 and an extension portion 182 that extends from portion 180. In the exemplary embodiment, portion 182 is coupled to valve 102, and U-shaped portion 180 is formed with a first portion 184 and a second portion 186. Each yoke portion 184 and 186 includes an opening 188 and 190, respectively. First portion 184 is positioned substantially flush against arm surface 228, and second portion 186 is positioned substantially flush against arm surface 230. Moreover, openings 188 and 190 are substantially concentrically aligned with opening 232 such that each opening 188, 190, and 232 is sized and oriented to receive a fastening mechanism 234 therethrough. Fastening mechanism 234 rotatably couples yoke 178 and arm 206 together. In an alternative embodiment, any fastening mechanism may be used that enable engine 10 to function as described herein.

During operation, valve assembly 100 is moveable between a first operational position 300 (shown in FIG. 3) and a second operational position 302 (shown in FIG. 4) to vary an amount of airflow channeled through ducts 44 and 46. Moreover, the design of valve assembly 100 facilitates reducing an amount of torque induced in rotating crank assembly 200.

In the exemplary embodiment, first operational position 300 is associated with the wing-born mode of the aircraft, and second operational position 302 is associated with the jet-born mode of the aircraft. As such, movement of slide valve 102 and fairings 128 and 130 using crank assembly 200 facilitates the aircraft transitioning between the jet-born mode and the wing-born modes of operation.

During engine operation, an operator may selectively position valve 102 and fairings 128 and 130 in first or second operational position 300 and 302 by moving crank assembly 200 from a first position (not shown) to a second position 304. Valve 102 and outer fairing 130 are translated and rotated around engine axis 11 during engine operation. In first operational position 300, valve 102 and inner and outer fairings 128 and 130 are positioned such that slide valve 102 is in a first position 310, and inner and outer fairings are in a first position 312 and 314, respectively. More specifically, when valve assembly 100 is in position 300, an inner bypass cross-sectional area 150 is defined between valve 102 and inner fairing 128, and an outer bypass duct cross-sectional area 160 is defined between valve 102 and outer fairing 130. Moreover, in first operational position 300, slide valve 102 is in its most axially aft position and inner and outer fairings 128 and 130 are each in their most axially forward position. Furthermore, valve 102 is in a first operational position, such that substantially all of fan bypass flow 48 is channeled downstream into inner bypass duct 44 and outer bypass duct 46. Fan bypass air 48 is separated into inner bypass air flow 50 and outer bypass air flow 52. Bypass air flow 50 flows through inner bypass duct 44 and bypass air flow 52 flows through outer bypass duct 46. In the exemplary embodiment, inner bypass air flow 50 flows into augmenter 28 through diffuser liner 42.

To move valve assembly 100 between first operational position 300 and second operational position 302, crank assembly 200 is rotated between the first position (not shown) and second position 304 such that the inner and outer bypass duct cross-sectional areas 150 and 160, respectively, are minimized. Specifically, crank assembly 200 is actuated by rotating portion 212 in a counter-clockwise direction 321, for example. Rotation of portion 212, causes arms 204 and 206 to rotate and translate valve 102, and inner and outer fairings 128 and 130 to translate. Specifically, in the exemplary embodiment, valve 102 and fairings 128 and 130 do not move independently of each other.

In the exemplary embodiment, as crank assembly 200 is rotated, valve 102 and inner and outer fairings 128 and 130 are moved substantially simultaneously. Specifically, valve 102 is repositioned from first position 310 to a second position 325, inner fairing 128 is moved downstream from first position 312 to a second position 326, and outer fairing 130 is moved downstream from first position 314 to a second position 328. In the exemplary embodiment, as valve 102 is moved in a forward direction 320, inner and outer fairings 128 and 130 are each moved aftward 323, such that valve 102 and inner and outer fairings 128 and 130 move towards one another. More specifically, in the exemplary embodiment, inner and outer fairings 128 and 130 are moved axially approximately the same distance between the first and second positions.

In the exemplary embodiment, movement of valve assembly 100 is controlled by rotating crank assembly 200 between the first position (not shown) and second position 304. More specifically, as valve assembly 100 is moved towards position 304, inner bypass duct cross-sectional area 150 is reduced to an inner bypass duct cross-sectional area 151 and outer bypass duct cross-sectional area 160 is reduced to an outer bypass duct cross-sectional area 161. Reducing cross-sectional areas 150 and 160 of each duct 44 and 46 reduces an amount of airflow that may be channeled through ducts 44 and 46 and closes down the areas within the duct. Specifically, when valve assembly 100 is in second operational position 302, a substantial portion of fan bypass air 48 is prevented from entering inner bypass duct 44 and/or outer bypass duct 46. As such, fan bypass air 48 may be channeled to other outlets (not shown), such as, for example, roll post nozzles that facilitate vertical lift of the aircraft. The remaining fan bypass air 48 is divided into inner bypass air flow 50 and outer bypass air flow 52. Bypass air flow 50 is channeled through inner bypass duct 44 and bypass air flow 52 is channeled through outer bypass duct 46. In the exemplary embodiment, inner bypass air flow 50 flows into augmenter 28 through diffuser liner 42. Accordingly, and as described in more detail below, valve assembly 100 and crank assembly 200 facilitate improving engine efficiency.

Moreover, during operation, valve assembly 100 and crank assembly 200 are oriented such that valve 102 and fairings 128 and 130 produce an opposing moment 321 on each arm 204 and 206 when loaded by aerodynamic forces. The size, shape, and materials used in fabricating each arm 204 and 206 are variably selected based on the anticipated aerodynamic loading. Ideally, each arm 204 and 206 is sized to balance the aerodynamic loads. Specifically, in the exemplary embodiment, during operation, as the airflow stream is channeled downstream, a fairing aerodynamic load 322 is induced to the upstream faces 332 and 334 of inner and outer fairings 128 and 130, respectively, and a blocker aerodynamic load 324 is induced to an upstream face of valve 102. As the airflow continues downstream, aerodynamic loads 322 and 324 are induced to crank assembly 200 to reduce the torque required to actuate valve assembly 100 and crank assembly 200, and a duct reaction 330 is imposed that counteracts loads 322 and 324. In other words, translating fairings 128 and 130 provide a counter-balance force to reduce the actuator force required to translate valve 102.

Arms 204 and 206 facilitate balancing aerodynamic loads 322 and 324 during operation such that a small resulting moment 321 is carried outside duct 44 as crank assembly 200 is rotated. For example, arm 204 absorbs a portion of fairing aerodynamic load 322 and arm 206 absorbs a portion of blocker aerodynamic load 324. Because positioning arms 204 and 206 are diametrically opposite of each other, loads 322 and 324 are facilitated to be balanced by arms 322 and 324.

The valve assembly and crank assembly facilitated reducing the system actuator load by approximately 70% in comparison to other known non-balanced systems. Moreover, reducing the actuator load and balancing the system by approximately 70% allows the overall weight of the system to be reduced by approximately 38%.

The above-described method and apparatus enables the selective control of a bypass duct cross-sectional area, and, as such, facilitates controlling the volume of fluid flowing through the bypass duct. More specifically, a contoured annular slide valve functions in combination with an aerodynamic-balanced crank assembly to enable the cross-sectional areas of an inner bypass duct and an outer bypass duct to be selectively varied when the annular valve and inner and outer fairings are axially displaced. The aerodynamic-balanced crank assembly includes a crank that is coupled to a translating valve assembly such that a reduced torque driving valve assembly 100 and crank assembly 200 provides for a reducing in weight and cost of various components of assemblies 100 and 200. Moreover, the horsepower requirements to drive assemblies 100 and 200 and the cooling requirements for the hydraulic actuators are reduced.

Exemplary embodiments of a method and apparatus for regulating a bypass flow volume are described above in detail. The apparatus is not limited to the specific embodiments described herein, but rather, components of the method and apparatus may be utilized independently and separately from other components described herein. For example, valve assembly and crank assembly may also be used in combination with other turbine engine components having a fluid flow therethrough, and is not limited to practice with only a turbine engine bypass flow, as described herein. Rather, the present invention can be implemented and utilized in connection with many other flow volume control applications.

While the invention has been described in terms of various specific embodiments, those skilled in the art will recognize that the invention can be practiced with modification within the spirit and scope of the claims.

What is claimed is:

1. A method of assembling a crank assembly for a turbine engine, the turbine engine includes a valve assembly including an outer fairing and an inner fairing coupled to the outer fairing with a strut, the valve assembly further includes an annular slide valve coupled between the inner and outer fairings, the valve assembly is positioned within a duct having a radially outer duct wall and a radially inner duct wall, said method comprising:

coupling a first arm of a crank assembly to the annular slide valve; and coupling a second arm of the crank assembly to the outer fairing such that the crank assembly controls movement of the annular slide valve and for moving the outer and inner fairings between a first operational position and a second operational position to facilitate regulating an amount of airflow channeled through the turbine engine.

2. A method in accordance with claim 1 further comprising:

coupling a first coupling mechanism between the first arm and the annular slide valve; and coupling a second coupling mechanism between the second arm and the outer fairing.

3. A method in accordance with claim 2 further comprising:

rotatably coupling the first coupling mechanism to the first arm using a coupling mechanism; and rotatably coupling the second coupling mechanism to the second arm with the same coupling mechanism.

4. A method in accordance with claim 1 further comprising orienting the first arm substantially diametrically opposite from the second arm.

5. A method in accordance with claim 1 further comprising coupling a portion of the crank assembly within the radially outer duct wall.

6. A method in accordance with claim 1 further comprising coupling the crank assembly to at least one actuation assembly configured to control movement of the crank assembly.

7. A method in accordance with claim 1 further comprising coupling the crank assembly to a sync ring configured to control movement of the crank assembly.

8. A crank assembly for a turbine engine, said turbine engine comprises a valve assembly comprising a radially outer fairing configured to translate along a radially outer duct wall of the turbine engine, a radially inner fairing configured to couple to said outer fairing such that said inner fairing is configured to translate along a radially inner duct wall of the turbine engine, and an annular slide valve coupled between the radially outer and the radially inner duct walls, said crank assembly comprising:
 a first arm; and
 a second arm, said first arm is coupled to said annular slide valve, said second arm is coupled to said outer fairing, said crank assembly controls movement of said annular slide valve and movement of said outer and inner fairings between a first operational position and a second operational position to facilitate regulating an amount of airflow channeled through the turbine engine.

9. A crank assembly in accordance with claim 8 wherein said crank assembly further comprises a tubular portion, said first and second arms are coupled to diametrically opposite sides of said tubular portion.

10. A crank assembly in accordance with claim 9 wherein said tubular portion is configured to couple to the radially outer duct wall of the turbine engine.

11. A crank assembly in accordance with claim 8 wherein each said first and second arms is variably selected to facilitate aerodynamically-balancing said crank assembly.

12. A crank assembly in accordance with claim 8 wherein each of said first and second arms has an opening extending therethrough, each of said openings is sized to receive a coupling mechanism therethrough.

13. A crank assembly in accordance with claim 8 wherein said crank assembly further comprises a first yoke coupled between said first arm and said annular slide valve.

14. A crank assembly in accordance with claim 8 wherein said crank assembly further comprises a second yoke coupled between said second arm and said outer fairing.

15. A crank assembly in accordance with claim 8 further comprising at least one actuation assembly coupled to said crank assembly to facilitate controlling movement of said crank assembly.

16. A turbine engine comprising:
 a fan assembly;
 a fan bypass duct coupled to the fan assembly;
 a valve assembly coupled downstream from the fan assembly within said fan bypass duct, said valve assembly comprising:
  a radially outer fairing configured to translate along a radially outer duct wall of the turbine engine;
  a radially inner fairing configured to couple to said outer fairing such that said inner fairing is configured to translate along a radially inner duct wall of the turbine engine; and
  an annular slide valve coupled between the radially outer and the radially inner duct walls; and
 a crank assembly comprising a first arm and a second arm, said first arm is coupled to said annular slide valve, said second arm is coupled to said outer fairing, said crank assembly controls movement of said annular slide valve and of moving said outer and inner fairings between a first operational position and a second operational position to facilitate regulating an amount of airflow channeled through the turbine engine.

17. A turbine in accordance with claim 16 wherein said crank assembly further comprises a tubular portion, said first and second arms are coupled to diametrically opposite sides of said tubular portion.

18. A turbine in accordance with claim 16 wherein said tubular portion is coupled to the radially outer duct wall of the turbine engine.

19. A turbine in accordance with claim 16 wherein each of said first and second arms is variably selected to facilitate aerodynamically-balancing said crank assembly.

20. A turbine in accordance with claim 16 wherein said valve assembly further comprises at least one actuation assembly coupled to said crank assembly to facilitate controlling movement of said crank assembly.

* * * * *